United States Patent
Ghannam et al.

(10) Patent No.: US 9,987,892 B2
(45) Date of Patent: Jun. 5, 2018

(54) TRAILER SAFETY CHAIN ATTACHMENT MONITORING SYSTEM

(71) Applicant: Ford Global Technologies, LLC, Dearborn, MI (US)

(72) Inventors: Mahmoud Yousef Ghannam, Canton, MI (US); David James Tippy, Ann Arbor, MI (US); Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 119 days.

(21) Appl. No.: 15/019,997

(22) Filed: Feb. 10, 2016

(65) Prior Publication Data
US 2017/0225692 A1    Aug. 10, 2017

(51) Int. Cl.
| | |
|---|---|
| *B60D 1/18* | (2006.01) |
| *B60D 1/28* | (2006.01) |
| *B60D 1/62* | (2006.01) |
| *B60D 1/64* | (2006.01) |
| *B60W 50/14* | (2012.01) |

(52) U.S. Cl.
CPC ............... *B60D 1/28* (2013.01); *B60D 1/185* (2013.01); *B60D 1/187* (2013.01); *B60D 1/62* (2013.01); *B60D 1/64* (2013.01); *B60W 50/14* (2013.01); *B60W 2050/146* (2013.01)

(58) Field of Classification Search
CPC .......... B60D 1/18; B60D 1/185; B60D 1/187; B60D 1/28; B60D 1/62; B60D 1/64
USPC .................. 254/266, 273, 275; 340/341, 687
See application file for complete search history.

(56) References Cited

U.S. PATENT DOCUMENTS

| | | | | |
|---|---|---|---|---|
| 3,722,916 A | * | 3/1973 | Muntjanoff | B60D 1/62 248/75 |
| RE28,590 E | * | 10/1975 | Salmi | B60D 1/38 280/477 |
| 4,271,401 A | * | 6/1981 | Meo | B60D 1/28 200/51.1 |
| 4,565,007 A | * | 1/1986 | Issenmann | E21B 45/00 33/732 |
| 5,362,084 A | * | 11/1994 | Edwards | B60D 1/28 280/432 |
| 5,861,814 A | * | 1/1999 | Clayton | B60D 1/36 280/504 |
| 6,178,650 B1 | * | 1/2001 | Thibodeaux | B60D 1/36 280/477 |
| 6,466,028 B1 | * | 10/2002 | Coppinger | B60D 1/62 324/504 |

(Continued)

FOREIGN PATENT DOCUMENTS

| | | |
|---|---|---|
| GB | 2474868 A | 4/2011 |
| WO | 2016075663 A1 | 11/2015 |

*Primary Examiner* — Joseph M Rocca
*Assistant Examiner* — Maurice L Williams
(74) *Attorney, Agent, or Firm* — Frank MacKenzie; Brooks Kushman P.C.

(57) ABSTRACT

A vehicle includes a controller and a frame having a receiver including an electrical connector configured to connect to a trailer having a plurality of chains. The plurality of chains each includes a sensor configured to transmit a position of the chain relative to a winch disposed on the trailer. The controller is configured to, in response to data from the sensors indicating a position of the chains, display via an interface a connection status of the chains.

9 Claims, 2 Drawing Sheets

(56) References Cited

U.S. PATENT DOCUMENTS

| | | | |
|---|---|---|---|
| 7,253,721 B2* | 8/2007 | Flohr | B60D 1/58 280/504 |
| 7,392,873 B2 | 7/2008 | Habacker | |
| 8,444,169 B1* | 5/2013 | Katz | B60D 1/065 280/477 |
| 8,976,246 B1* | 3/2015 | Rappuhn | B60D 1/36 348/148 |
| 9,026,268 B2* | 5/2015 | Kumar | B61C 17/12 267/220 |
| 9,688,111 B1* | 6/2017 | Ghannam | B60D 1/07 |
| 2002/0014975 A1* | 2/2002 | Lang | B60Q 1/2665 340/815.45 |
| 2002/0159270 A1* | 10/2002 | Lynam | B60Q 1/2607 362/487 |
| 2004/0124973 A1* | 7/2004 | Brown, Jr. | B60P 1/00 340/431 |
| 2008/0012695 A1* | 1/2008 | Herschell | B60T 7/18 340/431 |
| 2008/0191449 A1* | 8/2008 | Standen | B60D 1/36 280/427 |
| 2012/0025487 A1* | 2/2012 | Kneer | B60T 17/043 280/420 |
| 2012/0185131 A1* | 7/2012 | Headley | B60D 1/245 701/41 |
| 2013/0162420 A1 | 6/2013 | Stoddard | |
| 2014/0012465 A1* | 1/2014 | Shank | B60D 1/58 701/36 |
| 2014/0022067 A1* | 1/2014 | Dambra | B60P 1/4464 340/431 |
| 2014/0248996 A1 | 9/2014 | Adel | |
| 2014/0348593 A1* | 11/2014 | Kawahara | B66D 1/60 405/224 |
| 2015/0035256 A1* | 2/2015 | Klank | B60D 1/065 280/513 |
| 2015/0197281 A1* | 7/2015 | Miller | B62D 13/06 701/41 |
| 2016/0052548 A1* | 2/2016 | Singh | B60D 1/36 701/37 |
| 2016/0119539 A1* | 4/2016 | Tan | B60R 1/00 348/148 |
| 2016/0123136 A1* | 5/2016 | Puzrin | E21B 47/011 33/544.1 |
| 2016/0264220 A1* | 9/2016 | Laceky | H04N 5/2256 |
| 2017/0015162 A1* | 1/2017 | Walter | B60D 1/06 |
| 2017/0144878 A1* | 5/2017 | Koeninger | B67D 7/348 |

* cited by examiner

TRAILER SAFETY CHAIN ATTACHMENT MONITORING SYSTEM

TECHNICAL FIELD

The present disclosure relates to boat trailer safety systems.

BACKGROUND

Trailers can be attached to towing vehicles using trailer hitch systems. Trailer hitch systems consist of a tongue attached to the trailer and a receiver and ball attached to a frame of the vehicle. The tongue includes safety chains that connect to the receiver to aid in maintaining attachment between the tongue and the receiver. In the event of a slip of the tongue on the ball, the safety chains maintain a connection between the trailer and the towing vehicle. To be effective, trailer safety chains need to be crossed and attached to the receiver underneath the tongue and receiver on the trailer hitch system. Proper placement and attachment of the trailer safety chains is essential to ensuring the trailer is properly hooked onto the towing vehicle.

SUMMARY

A trailer attachment system for a vehicle includes an electrical connector and a controller configured to attach to a trailer. The trailer has at least one chain including a sensor. The sensor is configured to transmit data indicative of a position of the chain relative to a load secured to the trailer. The controller is configured to, in response to the data indicating a secured position of the chain, display via an interface a secured status of the chain.

A vehicle includes a controller and a frame having a receiver including an electrical connector configured to connect to a trailer having a plurality of chains. The plurality of chains each includes a sensor configured to transmit a position of the chain relative to a winch disposed on the trailer. The controller is configured to, in response to data from the sensors indicating a position of the chains, display via an interface a connection status of the chains.

A control method for a trailer hitch safety system includes, in response to sensor data from a trailer safety chain, indicative of an arrangement of the safety chain relative to a winch disposed on a trailer being in a secured position, display via an interface indicia representing a proper chain connection. The control method also includes, in response to sensor data from the trailer safety chain, indicative of an arrangement of the safety chain relative to a winch disposed on the trailer being in an unsecured position, display via an interface indicia representing an improper chain connection.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
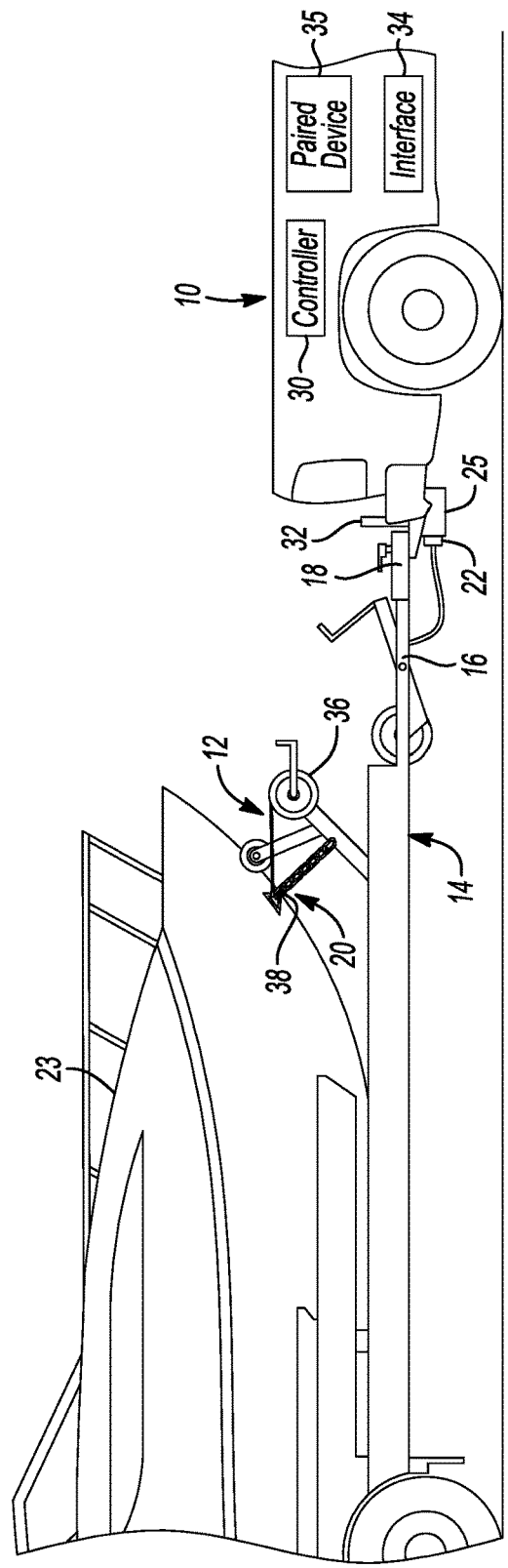
FIG. 1 is a top schematic view of a vehicle having a boat trailer safety system.

FIG. 1 depicts a top schematic view of a vehicle 10 having a trailer attachment system 12. The trailer attachment system 12 includes a trailer 14 with a trailer hitch 16, a tongue 18, and at least one safety chain 20. The trailer attachment system 12 also includes an electrical connector 25 configured to attach to the trailer 14. The trailer safety system 12 further includes a controller 30, and an external light 32 attached with a receiver 24, and an interface 34. The safety chain 20 includes a first sensor 38 and is configured to further secure a load 23 to a winch 36 disposed on the trailer 14. The safety chain 20 provides an additional and direct attachment of the load 23 to the trailer 14 in the event of a failure of the winch 36.

The safety chain 20 attaches to the load 23 and further secures the load 23 to the trailer 14 in the event of a failure of the winch 36. For example, if the winch 36 is not attached properly to the load 23 or does not properly lock the load 23 on the trailer 14, the load 23 may separate from the trailer 14 during travel. When the load 23 separates from the trailer 14, the load 23 becomes disconnected from the trailer 14 and as such the vehicle 10. If the safety chain 20 is not properly connected to the load 23 and trailer 14, a failure of the winch 36 may result in complete separation between the load 23 and the vehicle 10.

The trailer safety system 12 provides for detection and monitoring of the position of the safety chain 20 using the external light 32, the first sensor 38, and the interface 34. The trailer safety system 12 provides an early indication if the placement of the safety chain 20 is improper. As will be discussed in more detail below, the trailer safety system 12 communicates with the controller 30 to alert the controller 30 if the safety chain 20 is not connected, properly connected, or becomes disconnected or improperly connected during vehicle travel. This allows the controller 30 to activate various vehicle systems to ensure that an occupant is aware of the position of the safety chain 20. Increasing awareness of the position of the safety chain 20 allows the occupant an opportunity to remedy an improper use of the safety chain 20 and provides further safety when the vehicle 10 is towing a trailer 14 having a load 23.

The first sensor 38 may be a contact sensor. The first sensor 38 may be configured such that contact between the chain 20 and the load 23 allows the first sensor 38 to monitor the position of the safety chain 20. For example, if the safety chain 20 is connected to the load 23, contact between the first sensor 38 and the load 23 may indicate proper placement of the safety chain 20 to the controller 30. Likewise, if the chain 20 and the load 23 are not properly connected or are not in contact, the first sensor 38 may indicate improper contact or no contact, respectively. The first sensor 38 may use a variety of communication methods to indicate the position of the safety chain 20 to the controller 30.

The first sensor 38 may be any sensor configured to determine a position of the safety chain 20 relative to the load 23. In at least one embodiment, tactile sensors may be wrapped around the safety chain 20 to provide an indication of the position of the safety chain 20 to the controller 30. In at least one other embodiment, the first sensor 38 may include, but is not limited to, a magnetic field sensor, Hall Effect transducer, near field communication module, or radio frequency identification chip. As stated above, the first sensor 38 may be used to monitor the position of the safety chain 20 relative to the load 23 and the attachment between the safety chain 20 and the trailer 14. The first sensor 38 allows the controller 30 to provide an alert regarding the placement of the safety chain 20.

Communication between the first sensor 38 and the load 23 may be identified using the external light 32. For example, the controller 30 illuminates the external light 32 using a frequency based on the input from the first sensor 38 to allow for identification of the placement of the safety chain 20. If the safety chain 20 is properly attached to the load 23, the first sensor 38 may communicate the proper placement to the controller 30 based on a relative distance between the first sensor 38 and the load 23, which will illuminate the external light 32 at a first frequency. The first frequency may be representative of a constant frequency. Likewise, if the safety chain 20 improperly secures the load 23 to the trailer 14, the first sensor 38 may communicate the improper placement to the controller 30 based on the relative distance from the first sensor 38 to the load 23, which will illuminate the external light 32 at a second frequency. The second frequency may be representative of an intermittent frequency. The controller 30 may also be configured to illuminate the external light 32 using a third frequency if the first sensor 38 and the second sensor 42 indicate that the safety chains 20 are not connected to the receiver 24 based on the relative distance from the first sensor 38 to the load 23. The frequencies may be preset and other frequencies may be used to distinguish between proper placement, improper placement, and no connection of the safety chains 20.

The relative distance may be a preset distance that indicates a proper connection, an improper connection, or no connection. For example, if the first sensor 38 determines that the safety chain 20 is connected, based on contact between the safety chain 20 and the load 23, the first sensor may be configured to determine a relative distance between the first sensor 38, the load 23, and the trailer 14 to determine if the connection is secure. If the relative distance is below a threshold, then the first sensor 38 may indicate an improper connection. If the relative distance falls below a second threshold, the first sensor 38 may indicate no connection. Likewise, if the relative distance exceeds the threshold, the first sensor 38 may indicate a proper connection. The relative distance may also be based on the distance from the first sensor 38 to the winch 36.

The controller 30 may also be configured to illuminate the external light 32 using a variety of colors to distinguish between a proper connection, an improper connection, or no connection of the safety chain 20. For example, if the first sensor 38 indicates proper placement of the safety chain 20, then the controller 30 may illuminate the external light 32 to project a substantially greenish color. If the first sensor 38 indicates improper placement of the safety chain 20, then the controller 30 may illuminate the external light 32 to project a substantially yellowish color. And finally, if the first sensor 38 indicates that the safety chain 20 is not connected to the load 23, then the controller 30 may illuminate the external light to project a substantially reddish color. The colors described are merely an example and other colors may be used to indicate and distinguish between proper placement, improper placement, and no connection of the safety chain 20.

Using the external light 32 to indicate the position of the safety chain 20 allows for an instantaneous and initial feedback of the safety chain placement. The occupant may be able to determine, via the external light 32, if the safety chain 20 is properly attached to the load 23. This allows an occupant the ability to correct a possible improper placement, or remind the occupant to attach the safety chain 20 to the load 23. While described as a visual indication using an external light 32, an audible indication may also be contemplated. For example, a speaker (not shown) may be used in place of the external light 32 to indicate, using a variety of tones or dialects, whether the safety chain 20 is properly connected, improperly connected, or not connected to the load 23. This allows the trailer safety system 12 to provide an advanced indication of safely connected safety chain 20 before the vehicle 10 is operated on the road.

As stated above, the controller 30 may continuously monitor the position of the safety chains 20 as the vehicle 10 travels on the road. During operation of the vehicle 10, the controller 30 may be configured to continuously receive signals from the first sensor 38 to monitor the position of the safety chain 20. For example, the chain 20 may change a position relative to the load 23 or trailer 14 and then cause the safety chain 20 to be disconnected. The controller 30 may be configured to display a connection status of the safety chain 20 based on the input from the first sensor 38 to the interface 34. The interface 34 provides an indication whether the safety chain 20 has maintained a proper connection, an improper connection, or no connection during vehicle travel. The controller 30 may be configured to display the indication on the interface 34 through illuminating a light, displaying a symbol, or an audible tone or dialect. This allows the trailer safety system 12 to provide real-time monitoring and indication of the position of the safety chain 20. The controller 30 may also be configured to display the connection status of the safety chain 20 to a device 35 paired with the interface 34 using an in-vehicle network, Wifi, or Bluetooth connection.

Figure 2:
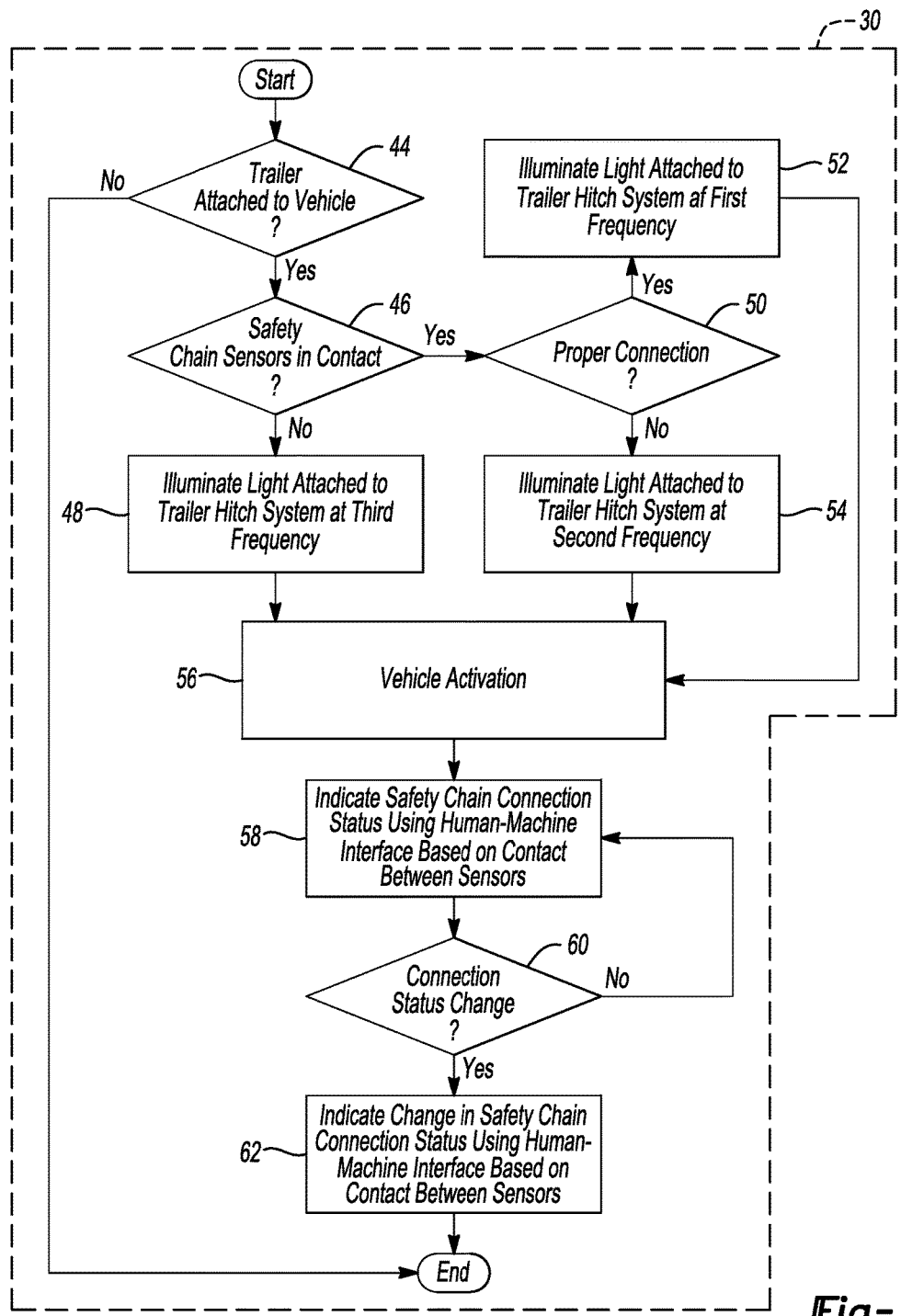
FIG. 2 is a control logic flow diagram for the boat trailer safety system.

FIG. 2 depicts control logic for the trailer safety system 12 used by the controller 30. The trailer safety system 12 uses control logic to operate as described above. However, the trailer safety system 12 may also segment the control logic. For example, the trailer safety system 12 may also be configured to only illuminate the external light as described above, or display the real-time position of the safety chains as described above. Likewise, the control logic for the trailer safety system 12 is described as sequential, however it may be operated simultaneously. Operation of the trailer safety system 12 may be accomplished using the steps described below in any manner or fashion that allows the trailer safety system 12 to operate as discussed.

At 44, the trailer safety system 12 may determine if the trailer is attached to the vehicle. Determining if the trailer is attached to the vehicle at 44 may be done using a pre-existing trailer monitoring system. If at 44 the trailer safety system 12 determines that no trailer is attached to the vehicle, the control logic ends. If at 44, the trailer safety system 12 determines a trailer is attached to a vehicle, then the trailer safety system 12 determines if the safety chain is in contact with the load at 46. The trailer safety system 12 determines if the safety chain is in contact at 46 using the sensor described above. If the trailer safety system 12 determines at 46 that the safety chain is not in contact based on input from the sensor, the trailer safety system 12 instructs the controller to illuminate the external light at a third frequency at 48. Illuminating external light at a third frequency at 48 may provide an immediate indication that the safety chain is not attached to the load.

If at 46 the trailer safety system 12 determines that the safety chain is in contact with the load, the trailer safety system 12 may determine the connection status of the safety chain relative to the load at 50. At 50, the trailer safety system 12 determines, based on input from the sensor, if the safety chains are properly connected using the relative distance and contact between the sensor and load. If at 50, the trailer safety system 12 determines that the safety chain is properly connected, the trailer safety system 12 instructs the controller to illuminate the external light at a first frequency at 52 indicative of a proper connection of the safety chain. Illumination of the external light at the first frequency at 52 provides an immediate indication that the safety chain is properly connected and ready for road use. If at 50, the trailer safety system 12 determines that the safety chain is not properly connected, the trailer safety system 12 instructs the controller to illuminate the external light at a second frequency at 54. Illumination of the external light at the second frequency at 54 provides an immediate indication that the safety chain is not properly connected.

The trailer safety system 12 may also be configured to receive input of vehicle activation at 56. Vehicle activation at 56 allows the trailer safety system 12 to determine if the vehicle is moving. The trailer safety system 12, after vehicle activation at 56, may then instruct the controller to display an indication of the safety chain connection status using the interface at 58. Displaying the safety chain connection status on the interface at 58 allows the trailer safety system 12 to provide real-time monitoring and assessment of the safety chain position within a cabin of the vehicle. The trailer safety system 12 determines at 60 if the connection status between the safety chain and the load has changed using the sensor. If at 60, the trailer safety system 12 determines that the connection status between the safety chain and the load has not changed, the trailer safety system 12 will continue to monitor input from the sensor to assess the safety chain position and display the status of the safety chain position using the interface at 58. If at 60, the trailer safety system 12 determines that the connection status of the safety chain and the load has changed, the trailer safety system 12 instructs the controller to indicate the change of status using the interface at 62. At 62, the trailer safety system may instruct the controller to display the change of status of the safety chain position using the interface, as described above.

The control logic for the trailer safety system 12 may be implemented on a single controller, or use multiple controllers to monitor vehicle systems, provide the indications as described above, and adjust various components of the vehicle to account for the position of the safety chains. The control logic described above further aids the vehicle to provide additional safety measures and allows for improved response time and indication of a potential change in safety chain positions.

While exemplary embodiments are described above, it is not intended that these embodiments describe all possible forms encompassed by the claims. The words used in the specification are words of description rather than limitation, and it is understood that various changes may be made without departing from the spirit and scope of the disclosure.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle trailer system comprising:
   a trailer chain including a sensor that transmits data indicative of a chain position; and
   a controller configured to:
   in response to data indicating a secured chain position, illuminate a light at a first frequency,
   in response to data indicating an unsecured chain position, illuminate the light at a second frequency; and
   in response to data indicating an unconnected chain position, illuminate the light at a third frequency.

2. The trailer attachment system of claim 1, wherein the controller is further configured to, in response to data indicating the unsecured chain position, display via an interface the unsecured status.

3. The trailer attachment system of claim 1, wherein the controller is further configured to continually monitor the data.

4. A vehicle comprising:
   a frame having a receiver including an electrical connector configured to connect to a trailer having a plurality of chains that each include a sensor configured to transmit a position of the chain relative to a winch disposed on the trailer;
   a light attached to the receiver and connected to the sensors such that a position of at least one of the sensors relative to the winch being below a threshold illuminates the light, wherein the light at a first frequency to indicate a proper connection between the chains and the winch, illuminate the light at a second frequency to indicate an improper connection between the chains and the winch, and illuminate the light at a third frequency to indicate an unconnected position; and
   a controller configured to, in response to data from the sensors indicating a position of the chains, display via an interface a connection status of the chains.

5. The vehicle of claim 4, wherein the controller is further configured to, in response to the connection status indicating a change in the position of the chains, alter the interface to indicate a corresponding change in the connection status.

6. A control method for a trailer hitch safety system comprising:
   in response to sensor data from a trailer safety chain, indicative of an arrangement of the safety chain relative to a winch disposed on a trailer being in a secured position, display, via an interface, indicia representing a proper chain connection such that a light illuminates at a first frequency;

in response to sensor data from the trailer safety chain, indicative of an arrangement of the safety chain relative to a winch disposed on the trailer being in an unsecured position, display, via an interface, indicia representing an improper chain connection such that the light illuminates at a second frequency; and in response to sensor data from the trailer safety chain, indicative of an arrangement of the safety chain being in an unconnected position, illuminate the light at a third frequency.

7. The control method of claim 6 further comprising transmitting to a device paired with the interface over a network the indicia representing the proper chain connection.

8. The control method of claim 6 further comprising transmitting to a device paired with the interface over a network the indicia representing the improper chain connection.

9. The control method of claim 6 further comprising, in response to the sensor data being indicative of a change in position, alter the indicia.

\* \* \* \* \*